(12) United States Patent
Boday et al.

(10) Patent No.: US 9,879,118 B2
(45) Date of Patent: Jan. 30, 2018

(54) POLYMERS FROM STABILIZED IMINES

(71) Applicant: International Business Machines Corporation, Armonk, NY (US)

(72) Inventors: Dylan J. Boday, Austin, TX (US); Jeannette M. Garcia, San Leandro, CA (US); James L. Hedrick, Pleasanton, CA (US); Rudy J. Wojtecki, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/249,218

(22) Filed: Aug. 26, 2016

(65) Prior Publication Data

US 2017/0107328 A1    Apr. 20, 2017

Related U.S. Application Data

(62) Division of application No. 14/875,256, filed on Oct. 5, 2015, now Pat. No. 9,550,863.

(51) Int. Cl.
  C08G 75/10    (2006.01)
  C08G 75/02    (2016.01)
  C08G 14/06    (2006.01)
  C08G 16/02    (2006.01)

(52) U.S. Cl.
  CPC ................... *C08G 75/02* (2013.01)

(58) Field of Classification Search
  CPC .................................................. C08G 75/10
  USPC .......................................................... 528/243
  See application file for complete search history.

(56) References Cited

U.S. PATENT DOCUMENTS

| | | | |
|---|---|---|---|
| 2,191,753 | A | 2/1940 | Coffman et al. |
| 2,889,277 | A | 6/1959 | Hughes |
| 3,340,232 | A | 9/1967 | Smith et al. |
| 3,598,748 | A | 8/1971 | Hirosawa |
| 3,957,742 | A | 5/1976 | Kveton |
| 4,086,211 | A | 4/1978 | Nakauchi et al. |
| 4,106,904 | A | 8/1978 | Oude Alink et al. |
| 4,224,417 | A | 9/1980 | Hajek et al. |
| 4,225,481 | A | 9/1980 | Wagner |
| 4,246,160 | A | 1/1981 | Wagner et al. |
| 4,301,262 | A | 11/1981 | Wagner et al. |
| 4,839,460 | A | 6/1989 | Molzahn |

(Continued)

FOREIGN PATENT DOCUMENTS

| | | |
|---|---|---|
| CN | 101265255 A | 9/2008 |
| CN | 101343421 A | 1/2009 |

(Continued)

OTHER PUBLICATIONS

U.S. Appl. No. 15/334,156 entitled "Polymers from Stabilized Imines,", filed Oct. 25, 2016.

(Continued)

*Primary Examiner* — Duc Truong
(74) *Attorney, Agent, or Firm* — Patterson + Sheridan, LLP

(57) ABSTRACT

The disclosure describes new compositions and methods related to polyaminals and related polymers. The compositions are useful as therapeutic/drug conjugates, self-healing materials, reversible crosslinking materials, degradable hydrogels, protective coatings, and as metal scavenging agents. New atom efficient synthetic schemes are disclosed, which yield previously unobtainable high molecular weight polyaminals.

16 Claims, 2 Drawing Sheets

(56) References Cited

U.S. PATENT DOCUMENTS

| | | | |
|---|---|---|---|
| 4,877,451 | A | 10/1989 | Winnik et al. |
| 5,112,796 | A | 5/1992 | Iannicelli |
| 5,554,349 | A | 9/1996 | Rivers et al. |
| 5,674,377 | A | 10/1997 | Sullivan, III et al. |
| 5,795,560 | A | 8/1998 | Reed |
| 5,830,243 | A | 11/1998 | Wolak et al. |
| 5,958,352 | A | 9/1999 | Callaway et al. |
| 6,132,933 | A | 10/2000 | Nguyen |
| 6,419,945 | B1 | 7/2002 | Gresser et al. |
| 6,541,181 | B1 | 4/2003 | Levanon et al. |
| 6,566,035 | B1 | 5/2003 | Aoshima |
| 6,641,978 | B1 | 11/2003 | Chapman et al. |
| 6,911,300 | B2 | 6/2005 | Sato et al. |
| 7,384,434 | B2 | 6/2008 | Malfer et al. |
| 7,652,119 | B2 | 1/2010 | Wakabayashi et al. |
| 7,989,146 | B2 | 8/2011 | Burberry et al. |
| 8,389,205 | B2 | 3/2013 | Duerig et al. |
| 8,450,043 | B2 | 5/2013 | Coady et al. |
| 8,562,964 | B2 | 10/2013 | Ljubimova et al. |
| 8,574,815 | B2 | 11/2013 | Coady et al. |
| 8,632,947 | B2 | 1/2014 | Bentley et al. |
| 9,120,897 | B1 | 9/2015 | Boday et al. |
| 9,228,059 | B2 | 1/2016 | Boday et al. |
| 9,388,281 | B2 | 7/2016 | Boday et al. |
| 9,534,084 | B1 | 1/2017 | Boday et al. |
| 9,550,863 | B1 | 1/2017 | Boday et al. |
| 2003/0039689 | A1 | 2/2003 | Chen et al. |
| 2004/0060405 | A1 | 4/2004 | Kao |
| 2007/0077511 | A1 | 4/2007 | Tredwell et al. |
| 2009/0039018 | A1 | 2/2009 | Jordi et al. |
| 2009/0250659 | A1 | 10/2009 | Gatlin |
| 2010/0048756 | A1 | 2/2010 | Loccufier et al. |
| 2010/0107476 | A1 | 5/2010 | Cosimbescu |
| 2011/0271096 | A1 | 11/2011 | Bharrat et al. |
| 2012/0049308 | A1 | 3/2012 | Nishimura et al. |
| 2012/0232328 | A1 | 9/2012 | Gwenin et al. |
| 2014/0013425 | A1 | 1/2014 | Samson |
| 2017/0049902 | A1 | 2/2017 | Hedrick et al. |

FOREIGN PATENT DOCUMENTS

| | | | |
|---|---|---|---|
| EP | 2636697 | A1 | 9/2013 |
| GB | 535577 | A | 4/1941 |
| GB | 928112 | A | 6/1963 |
| GB | 942932 | A | 11/1963 |
| GB | 1531578 | A | 11/1978 |
| JP | 2006516548 | A | 7/2006 |
| JP | 2006519766 | A | 8/2006 |
| WO | 0166614 | A2 | 9/2001 |
| WO | 0198388 | A1 | 12/2001 |
| WO | 0226849 | A1 | 4/2002 |

OTHER PUBLICATIONS

U.S. Appl. No. 15/287,419 entitled "High Molecular Weight Polythioaminals from a Single Monomer,", filed Oct. 6, 2016.

U.S. Appl. No. 14/952,488 entitled "Polythioaminal Dispersions and Coatings,", filed Nov. 25, 2015.

U.S. Appl. No. 15/249,218 entitled "Polymers From Stabilized Imines,", filed Aug. 26, 2016.

Gavin 0. Jones et al., Computational and Experimental Studies on the Mechanism of Formation of Poly (hexahydrotriazine)s and Poly(hemiaminal)s from the Reactions of Amines with Formaldehyde: Organic Letters, 2014, 5502-5505, American Chemical Society, USA. [Abstract Only].

Katrin Knop, Richard Hoogenboom, Dagmar Fischer, and Ulrich S. Schubert, Poly(ethylene glycol) in Drug Delivery: Pros and Cons as Well as Potential Alternatives. Angewandte Chemie, 2010, 6288-6308, Wiley-VCH Verlag GmbH & Co. KGaA Weinheirn.

Stuart J. Rowan, Stuart J. Cantrill, Graham R L Cousins, Jeremy K. M. Sanders, and J. Fraser Stoddart, Dynamic Covalent Chemistry, Angew. Chem. Int. Ed. 2002, 41, 898±952, Wiley-VCH Verlag GmbH, 69451 Weinheim, Germany.

Jeannette M. Garcia et al., Recyclable, Strong Thermosets and Organogels via Paraformaldehyde Condensation with Diamines. Science, 344, "132 (2014), American Association for the Advancement of Science, USA.

G. Saito et al. Advanced Drug Delivery Reviews 55 (2003) 199-215, Elsevier Science B.V., USA.[Abstract Only].

Rudy J. Wojtecki, Michael A. Meador and Stuart J. Rowan, Using the Dynamic Bond to Access Macroscopically Responsive Structurally Dynamic Polymers, Mature Materials vol. 10 Jan. 2011, Macmillan Publiers Limited, USA.

Zhu et al. (Journal of Polymer Science: Part A: Polymer Chemistry, vol. 40, 1321-1333 (2002)). [Abstract Only].

Henri Ulrich et al. Reaction of Chloromethyl Ether with Primary Amines, May 1961, pp. 1637-1638.

Hemant S. Patel et al., Studies on Synthesis and Characterization of some Novel Aromatic Copolyesters based on s-Triazine, Iranian Polymer Journal, vol. 14, No. 12, 2005, pp. 1090-1098.

Fabin Suriano et al. Functionalized cyclic carbonates: from synthesis and metal-free catalyzed ring-opening polymerization to applications, Polymer Chemistry, The Royal Society of Chemistry, 2011, pp. 528-533.

Hydrogen Sulfide Management. Mitigation options in petroleum refining, storage and transportation, White Paper, Baker Hughes, pp. 1-12.

Wang Yulan et al., Synthesis and Properties of Poly-1, 3, 5-Triazines, Polymer Communications, No. 2, '1984, pp. 117-123.

John Markoff, Error at IBM Lap Finds New Famiiy of Materials, New York Times, May 15, 2014, 4 pages.

Jeanette M. Garcia et al., Recyclable, Strong Thermosets and Organogels via Paraformaldehyde Condensation with Diamines, Science AAAS, vol. 344, May 2014, pp. 732-735.

D.R. Anderson et al., Thermally resistance polymers containing the S-friazine ring, Journal of Polymer Science Part A-1: Polyrner Chemistry, vol. 4, Issue 7, pp. 1689-1702.

Raquel Lebrero et al.. Odor abatement in biotrickling filters: Effect of the EBRT on methyl mercaptan and hydrophobic VOCs removal, Bioresource Technology, Special Issue: Innovative Researches on Algal Biomass. vol. 109, Apr. 2012, pp. 38-45.

Elbert, et al. "Conjugate Addition Reactions Combined with Free-Radical Cross-Linking for the Design of Materials or Tissue Engineering," Biomacromolecules 2001, 2. 430-441; Published on Web Mar. 3, 2001.

Ferrar, "Reactions of Formaldehyde With Aromatic Amines," J. Appl. Chem, 14, 1964, 389-399.

Geng, et al., "Nanoindentation behavior of ultrathin polymeric films," Polymer 46 (2005) 11768-1 "1772; Available online Oct. 19, 2005.

Hiller, et al. "Laser-engraveable hexahydrotriazine polymer networks," Mat Res Innovat (2002) 6: 179-184.

Oliver, et al. "Measurement of hardness and elastic modulus by; instrumented indentation: Advances in understanding and; refinements to methodology," J. Mater. Res., vol. 19, No. 1, Jan 2004, 3-20.

Singh, et al., "Ultrasound mediated Green Synthesis of Hexa-hydro Triazines," J. Mater. Environ. Sci. 2 (4) (2011) 403-406.

Stafford, et al., "A buckiing-based metroiogy for measuring; the eiastic moduli of poiymeric thin films," Nature Materials_Aug. 3, 2004, 545-550; Published online: Jul. 11, 2004.

Ekinci et al., "Preparation, Characterization and H2O2 Selectivity of Hyperbranched Polyimides Containing Triazine". Journal of Polymer Research, 2005, pp. 205-210.

POLYMERS FROM STABILIZED IMINES

This application is a DIV of Ser. No. 14/875,256 filed on Oct. 5, 2015 now U.S. Pat. No. 9,550,863

FIELD

The present disclosure relates to new compositions and methods related to polyaminals and related polymers. The compositions are useful for coatings, metal scavenging agents, $CO_2$ capture, and therapeutic agent delivery.

BACKGROUND

Polythioaminals (PTAs), a sub-set of polyaminals (PAs), may be produced by polymerization of hexahydrotriazines (HTs) with dithiols. The resulting polymers exhibit structurally dynamic behavior brought about by a chemical trigger (thiols). This structurally dynamic behavior is an attractive material property with potential application as therapeutic/drug conjugates, coatings, self-healing materials, reversible crosslinking materials, and as degradable hydrogels.

The synthesis of multifunctional PTAs of average molecular weights greater than 5000 grams/mole has been hampered by the current methods of PTA synthesis via HTs and dithiols. These methods and reaction pathway(s) involve the expulsion of volatile amine by-products (originating from the HT starting material), and which in turn has a negative impact on the reaction kinetics and thermodynamics. For example, it has been observed that as the molecular weight of the organic substituent bonded to the volatile amine by-product increases, the volatility of the amine by-product decreases, which results in a slower polymerization reaction and lower molecular weight PTAs (less than 5,000 gram/mole average).

To improve on the state of the art, there is a need for new synthetic schemes and pathways to functional PTAs and polyaminals (PAs) that bypass and do not depend on the formation and removal of volatile amine by-products. A useful new synthetic pathway is expected to yield PAs and PTAs of higher molecular weight and well defined architectures for expanded applications. It would be a further advantage to produce new PAs from multifunctional nucleophiles comprising heteroatoms other than sulfur, for applications intolerant of the odor of sulfur, and for those requiring oxidation resistant structures and functionality.

SUMMARY

The disclosure describes a polymer having the general structure:

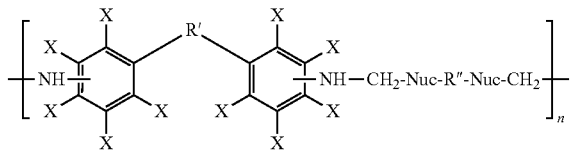

wherein R' is an organic group, a hetero-organic group, or a hetero-atom; each X is an organic group, a hetero-organic group, or a hetero-atom, and wherein at least two X groups are each a polyaminal segment —NH—CH$_2$—Nuc-R"—Nuc-CH$_2$—, and wherein Nuc is a nucleophilic atom; and wherein R" is an organic group or a hetero-organic group.

The polymer may have electron withdrawing or accepting groups, wherein the electron withdrawing or accepting group is selected from the group consisting of: electronegative heteroatoms, positively charged groups, quaternary amine groups, conjugated groups, aromatic groups, halogens, nitriles, carbonyls, nitro groups, nitroso groups, sulfones, and sulfonates, and has an average molecular weight of at least 5,000 grams/mole.

The disclosure also describes a method for producing a polymer, the method comprising forming a reaction mixture comprising a polar solvent, an aminobenzene compound, a multifunctional nucleophile, an imine forming precursor; and heating the reaction mixture at a temperature from about 50° C. to about 150° C. to produce a polymer. The aminobenzene compound may comprise at least two amine groups, and/or electron withdrawing or accepting groups, selected from the group consisting of: electronegative heteroatoms, positively charged groups, quaternary amine groups, conjugated groups, aromatic groups, halogens, nitriles, carbonyls, nitro groups, nitroso groups, sulfones, and sulfonates.

Another method is described in the disclosure, a method for producing a polymer, comprising: forming a reaction mixture comprising a non-polar or a polar solvent and an imine compound comprising electron withdrawing or accepting groups; adding a multifunctional nucleophile to the reaction mixture; and heating the reaction mixture at a temperature from about 50° C. to about 150° C. to produce a polymer.

BRIEF DESCRIPTION OF THE SEVERAL VIEWS OF THE DRAWINGS

So that the manner in which the above recited features of the present disclosure can be understood in detail, a more particular description of the disclosure, briefly summarized above, may be had by reference to embodiments, some of which are illustrated in the appended drawings and in the body of the specification. It is to be noted, however, that the appended and embedded drawings illustrate only typical embodiments of this disclosure and are therefore not to be considered limiting of its scope, for the disclosure may admit to other equally effective embodiments.

Figure 1A:
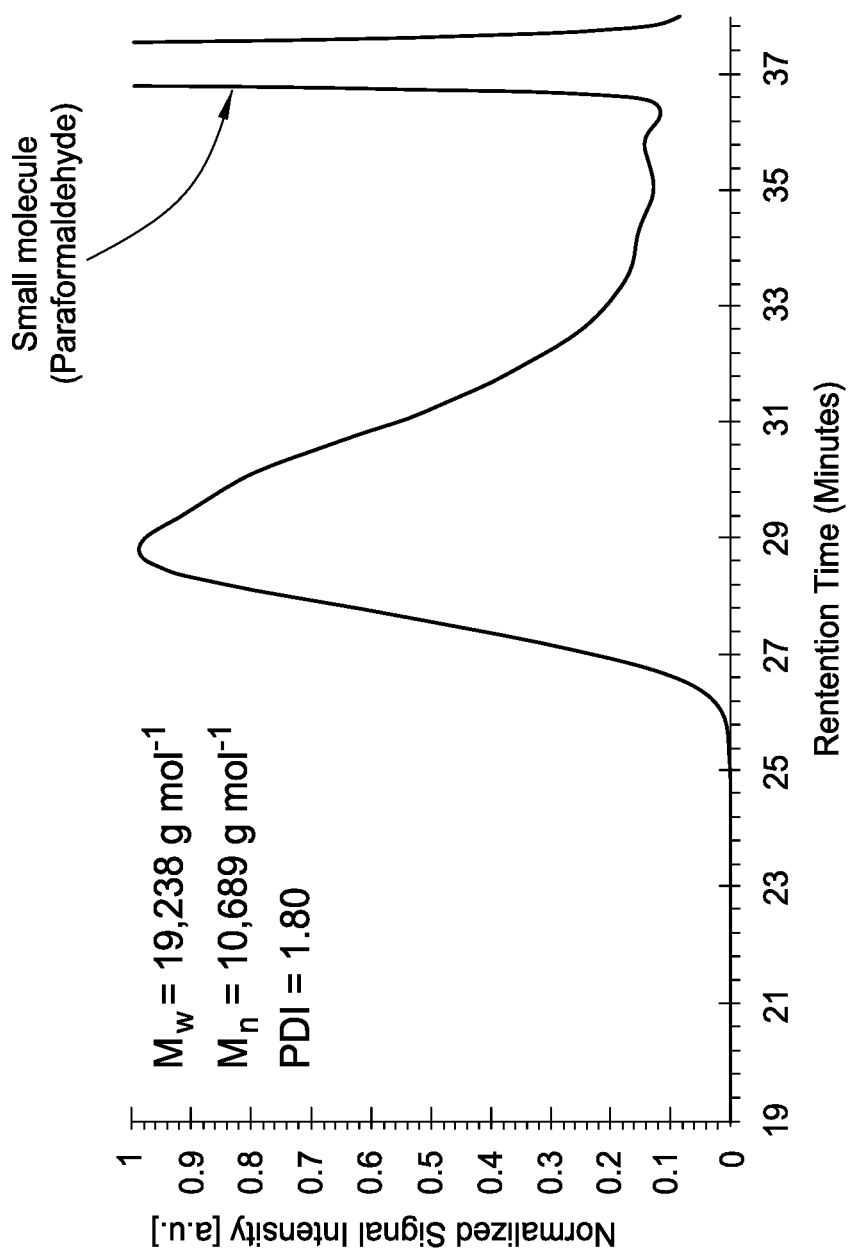
FIG. 1A is a GPC trace of a PTA produced by the improved method of the disclosure.

To facilitate understanding, identical reference numerals have been used, where possible, to designate identical elements that are common to the figures and drawings. It is contemplated that elements disclosed in one embodiment may be beneficially utilized on other embodiments without specific recitation.

DETAILED DESCRIPTION

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Similarly, the terms "further comprises," "may further comprise," and "further comprising," when used in this specification, specify the presence of additional features or components, without precluding the presence or addition of other features or components. The terms "further comprises," "may further comprise", and "further comprising" in this specification do not mean that any features or components are excluded from any embodiments. When a range is used to express a possible value using two numerical limits a and b (e.g., a concentration of a ppm to b ppm), unless otherwise stated the value can be a, b, or any number between a and b.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and their practical application, and to enable others of ordinary skill in the art to understand the invention.

The inventors have synthesized a new polymer having the general structure and repeat unit:

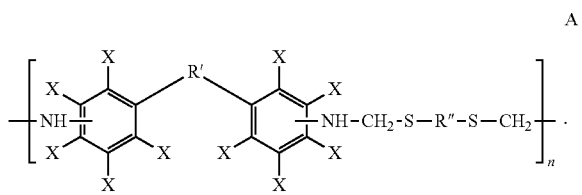

A

The polymer (polymer A) as shown, is an example of a polythioaminal (PTA), a sulfur containing polymer, which is subset of the polyaminals (PAs), or polymers that contain at least one the aminal group or linkage. In the case of polymer A, the aminal group or segment is —NH—CH$_2$—S—, wherein a carbon atom is covalently bonded to a first and a second heteroatom, such as N and S. In polymer A, the aminal segment —NH—CH$_2$—S—, is a part of the larger —NH—CH$_2$—S—R"—S—CH$_2$— segment or linkage shown in the repeat unit. In an expansion beyond the current state of polyaminal synthesis, the sulfur atom of polymer A may be substituted or replaced by a different heteroatom, which may be abbreviated as "Nuc" (as in nucleophile). Nuc is a nucleophilic heteroatom, neutral or negatively charged, and may be selected from the group consisting of: Si, Ge, Sn, N, P, As, Sb, O, S, Se, Te. For example, in some embodiments, a difunctional alcohol or alkoxide compound may be used to synthesize a polymer similar to polymer A, and the heteroatom is thus integrated into a larger aminal comprising segment or linkage such as —NH—CH$_2$—O—R"—O—CH$_2$—. Likewise, if an organic dithiol is used, an aminal comprising segment or linkage comprising —NH—CH$_2$—S—R"—S—CH$_2$— is produced. As mentioned prior, the nucleophile may be neutral and/or negatively charged. A nucleophile may react with or add to an electrophile, such as a stabilized imine compound, and may have lone pair(s) of electrons that will be attracted to electrophilic centers or moieties. If the nucleophile is a negatively charged component of a chemical compound, the counterbalancing positive charge or charges in the compound may be associated with an alkali metal, an alkaline earth metal, or a transition metal. For example, in one embodiment, a dicarbanion, such as a difunctional Grignard reagent (organomagnesium halide), such as MgBrCH$_2$(CH$_2$)$_3$CH$_2$MgBr, may add to a diimine to form a polymer. Generally, a difunctional or multifunctional compound, comprising at least two nucleophilic atoms, may be used to prepare a polymer such as a PA, and is illustrated as chemical structure 1 (example: difunctional). Chemical structure 2 represents a dithiol compound that may be used to prepare a PTA, according to some embodiments of the disclosure.

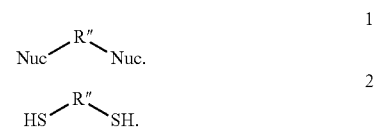

The R" of polymer A, and in the difunctional building blocks represented by chemical structures 1 and 2, may be a single atom, a chemical group, an oligomeric group, or polymeric segment. For example, in one embodiment, R" is a —CH$_2$— group, while in other embodiments, R" may a —(CH$_2$)$_6$— group, or R" may be polymeric, such as a polyester, polyether, or a polyolefin.

Polymer A and related PAs may include an R' group, which represents an atom, oligomer, or polymer that covalently links the aromatic rings. R' may include a heteroatom, such as oxygen, or heteroatoms that are part of a larger chemical group, such as organic group. R' may also include aliphatic or aromatic groups and/chains, and may include electrically conjugated groups such as conjugated double bonded carbon groups. In one embodiment, R' may be a carbon atom that is bonded to other atoms or moieties, such as —CH$_3$ groups. In another embodiment, R' may be a hetero-organic polymeric group comprising one or more carbon atoms and heteroatoms such as oxygen and fluorine, such as a polyfluoroether. In further embodiments, R' may have conjugated groups, wherein the electrons may delocalize in a chemical group or along chain of atoms. R' may be an electron accepting group or groups (EAGs). In another embodiment, R' may have one or more electron withdrawing groups (EWGs) containing electronegative atoms that may inductively attract electron density away from the neighboring aromatic rings. Importantly, EAGs and EWGs have been found to stabilize the imine moieties, and may be used to prepare the PA materials. Examples of EAGs and EWGs include, but are not restricted to the group consisting of: conjugated groups, aromatic groups, nitriles, carbonyls, nitro groups, nitroso groups, sulfones, sulfonates, electronegative heteroatoms, halogens, positively charged groups, and quaternary amine groups. In one example, difunctional aminobenzene compounds (which are electrophilic imine precursors) may be used to synthesize polymer A. As shown below, a difunctional aminobenzene compound, as represented in chemical structure 3, includes a generic R' group, while chemical structure 4, represents a difunctional aminobenzene compound, where R' includes —CF$_3$ EWGs.

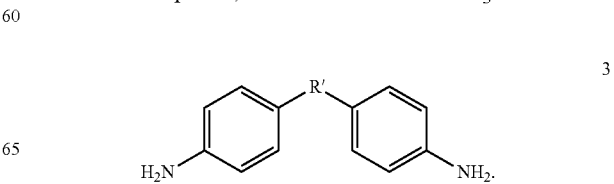

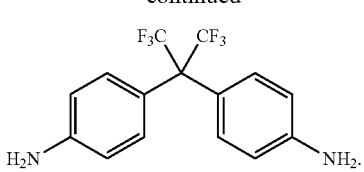

Notably, and in reference to structure 4, it was discovered by the inventors that difunctional aminobenzene compounds or aniline compounds with EWGs at R' will produce PTAs of higher average molecular weights in contrast to the prior art. These aspects will be discussed later in the disclosure. We further note that in this disclosure, aminobenzene, phenylamine, and aniline are the same compound, and the nomenclature may be used interchangeably. However, reference to "an aminobenzene", "aminobenzenes", and "aminobenzene compounds" does not refer only to the single compound aminobenzene, but also includes all varieties of substituted aminobenzenes.

Referring once more to the polymer A structure or repeat unit, polymer A may also have "X" chemical groups or atoms that are covalently bonded to the aromatic ring(s), and wherein at least two X chemical groups in the repeat unit include a thioaminal linking segment —NH—$CH_2$—S—R"—S—. In another embodiment, three X groups include linking segments or functional groups that may form a crosslinked version of polymer A. The repeat unit of polymer A may additionally include at least two thioaminal group segments —NH—$CH_2$—S—R"—S—$CH_2$—, wherein each thioaminal group segment may be covalently bonded to a specific selected aromatic ring position to create structural isomers, such as ortho, meta, or para. The ring attachment point of a thioaminal group segment —NH—$CH_2$—S—R"—S—$CH_2$— may vary, such that the thioaminal group segment may be ortho, meta, or para in respect to the R' linking group. The difunctional aniline compounds 3 and 4, which are diimine precursors, may yield a PTA wherein the thioaminal group segments —NH—$CH_2$—S—R"—S—$CH_2$— are para in respect to R'. Generally, the identity of the other X groups or atoms covalently attached to the aromatic ring of polymer A, excluding the thioaminal group segment(s), may include any chemical group, oligomer, or polymer. For example, in one embodiment, X is a hydrogen atom. In other embodiments, X may be a heteroatom such as oxygen, or heteroatoms that are part of another chemical group, or X may be a pendant aliphatic group, such as stearyl, lauryl, or cetyl, which may improve or aid polymer solubility in a non-polar solvent. Polarity and chain length of X groups may be selected to create desired solubility characteristics.

In further embodiments, X may include conjugated groups, wherein the electrons may delocalize in a chemical group or along chain of atoms, which was defined prior as electron accepting groups (EAGs). In another embodiment, X may have EWGs that contain electronegative atoms that may inductively attract electron density away from the aromatic ring(s). As mentioned above, EAGs and EWGs may be selected from the group consisting of: conjugated groups, aromatic groups, nitriles, carbonyls, nitro groups, nitroso groups, sulfones, sulfonates, electronegative heteroatoms, halogens, positively charged groups, and quaternary amine groups. To synthesize polymer A, or related PAs, difunctional aniline diimine precursor compounds comprising EAGs or EWGs may be used, as represented by chemical structures 5 and 6:

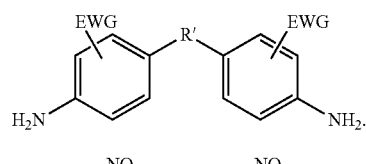

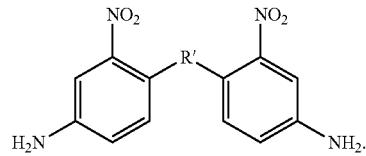

Chemical structure 5 represents a difunctional aniline diimine precursor compound wherein at least one hydrogen atom of each aromatic ring is replaced by an EWG. In one embodiment, chemical structure 6, a difunctional aniline diimine precursor compound containing two nitro EWGs, may be used to synthesize a dinitro stabilized diimine. The dinitro stabilized diimine may then be reacted with a dinucleophile, such as a dialkoxide, such as KO—$CH_2$—$(CH_2)_3$—$CH_2$—OK, to produce a PA material, such as a polyoxoaminal.

As illustrated in reaction example 1, polyaminals, such as polymer A, and related polymers produced from stabilized imines, and containing EWGs, may be formed as follows:

Reaction Example 1

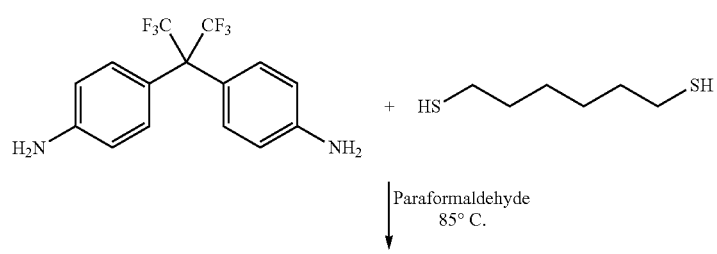

Paraformaldehyde
85° C.

-continued

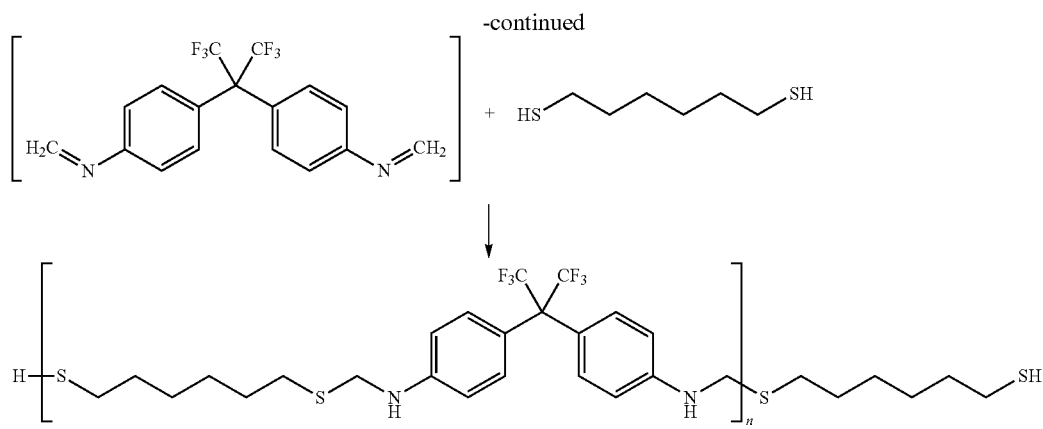

Figure 1B:
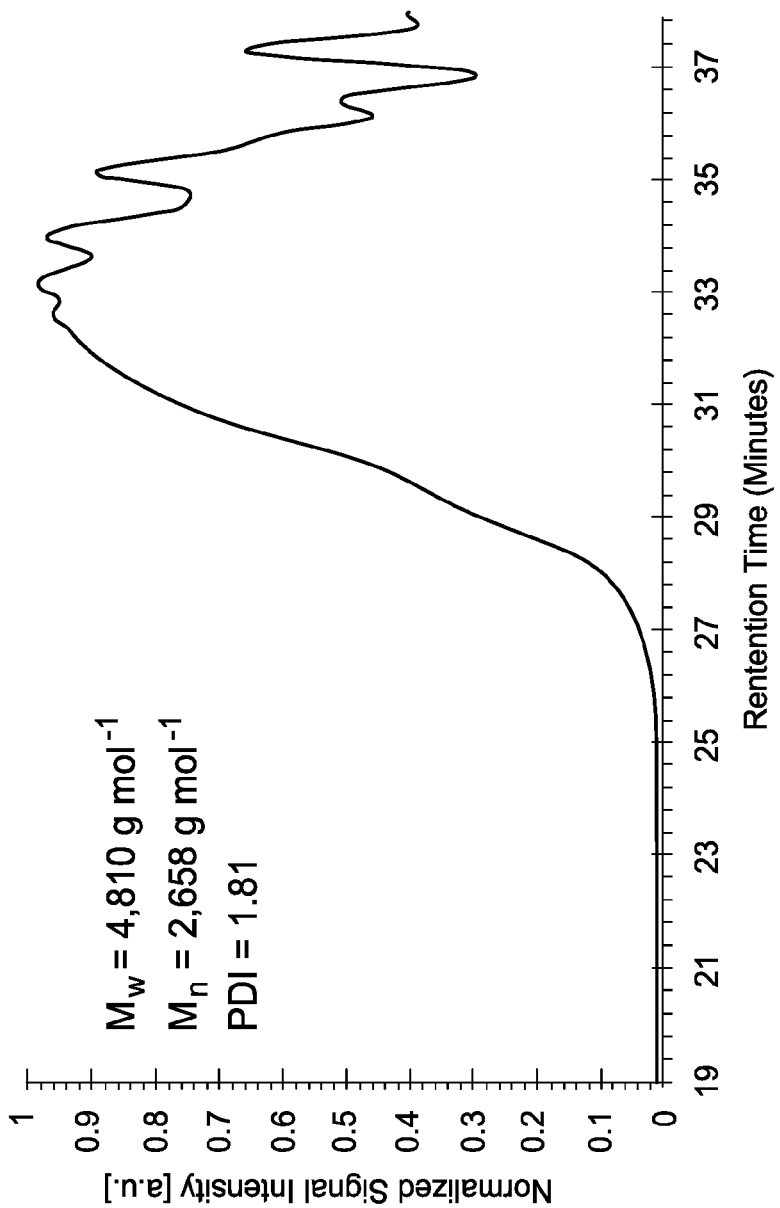
FIG. 1B is a GPC trace of a PTA produced by an earlier method that produces a volatile amine by-product.

As shown in reaction example 1, a difunctional aniline diimine precursor compound, 4,4'-(hexafluoroisopropylidene)dianiline (FDADP), comprising —CF$_3$ EWGs, may be combined with paraformaldehyde (PF) and 1,6-hexanedithiol (HDT) in a ratio of about 1:1:2.5 (FDADP:HDT:PF) in a sealed and nitrogen purged reaction vessel. The reaction mixture may then be heated at a temperature from about 50° C. to about 150° C. for a time period from about 1 hour to about 24 hours, such as at a temperature of about 85° C. for about 18 hours. The reaction may be performed with or without solvent. The polymerization reaction as described is advantageously a "one-pot" synthesis, wherein a difunctional imine 4,4'-(hexafluoroisopropylidene)diimine) intermediate may be formed in situ upon exposure to paraformaldehyde, followed by reaction with 1,6-hexanedithiol to form the PTA. In such a reaction, a diimine stabilized by —CF$_3$ EWGs, produces a high molecular weight PTA ($M_w$=19,238 grams/mole $M_n$=10,689 grams/mole) as measured by gel permeation chromatography, as shown in FIG. 1A. In contrast, when similar chemical reactions are performed without dianiline diimine precursors stabilized by —CF$_3$ EWGs, such as 4,4'-methylenedianiline (4,4'-diaminodiphenylmethane), only low molecular weight PTAs ($M_w$=4,810 grams/mole $M_n$=2,658 grams/mole) may be isolated, as measured by GPC, and as illustrated in FIG. 1B. In this disclosure, standard nomenclature for referring to molecular weight averages is used. Thus, $M_w$ means "weight-average molecular weight" and $M_n$ means "number-average molecular weight"

Reaction example 1 and related embodiments may also be performed in the presence of a solvent or a mixture of solvents if so desired. In some embodiments, a suitable polar aprotic solvent may be used such as N-methyl-2-pyrrolidone (NMP), dimethylsulfoxide (DMSO), N,N-dimethylformamide (DMF), N,N-dimethylacetamide (DMA), propylene carbonate (PC), and propylene glycol methyl ether acetate (PGMEA). The aforementioned polar solvents may be used to dissolve paraformaldehyde.

In other embodiments, a low polarity or non-polar aprotic solvent may be used to produce the PTA or PA, such as tetrahydrofuran, dimethyl ether, methylene chloride, toluene, benzene, and kerosene. In this synthetic scheme, step one involves the separate formation and isolation of a EAG/EWG stabilized multifunctional imine, such as a stabilized diimine. Advantageously, the stabilized diimine thus prepared and isolated may have a solubility in a low polarity or non-polar aprotic solvent, which may enable the practitioner to further control and/or manipulate the reaction conditions and potentially tune the reactivity of the components, as a solvent may effect the reaction kinetics and/or thermodynamics, such as a stabilizing or destabilizing effect on the transition state of the reaction. In step two of the embodiment, a stabilized diimine, such as 4,4'-(hexafluoroisopropylidene)diimine (comprising —CF$_3$ EWGs), may be combined with 1,6-hexanedithiol (HDT) in a ratio of about 1:1, in a sealed and nitrogen purged reaction vessel. Herein, the diimine may be dissolved in a suitable solvent at a chosen molarity, to the reaction vessel containing the dithiol, which itself may be dissolved in a suitable low polarity or non-polar aprotic solvent of a chosen molarity. The order and rate of addition of the components may be adjusted, and the reaction mixture may be heated at a temperature from about 50° C. to about 150° C., for a time period from about 1 hour to about 24 hours, such as at a temperature of about 85° C. for about 18 hours. The temperature of the reaction may be adjusted depending on the boiling point of the solvent, and/or if reflux conditions are desired. Isolation and purification of the PTA or PA material may be achieved by cooling, followed by precipitation and washing in a suitable solvent and drying. The polymer product may be redissolved in a suitable deuterated solvent for nuclear magnetic resonance experiments, such as DOSY-NMR and/or other 2D NMR techniques to analyze the polymer product and identify the peaks corresponding to the repeat unit moieties. Gel permeation chromatography (GPC) may also be used to determine the number average molecular weight of the substituted polymer.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. When a range is used to express a possible value using two numerical limits X and Y (e.g., a concentration of X ppm to Y ppm), unless otherwise stated the value can be X, Y, or any number between X and Y.

A The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and their practical application, and to enable others of ordinary skill in the art to understand the invention.

What is claimed is:

1. A method for producing a polymer, comprising:
   forming a reaction mixture comprising a solvent, an aminobenzene compound, a multifunctional nucleophile, an imine forming precursor; and
   heating the reaction mixture at a temperature from about 50° C. to about 150° C. to produce a polymer.

2. The method of claim 1, wherein the aminobenzene compound comprises at least two amine groups.

3. The method of claim 1, wherein the aminobenzene compound comprises electron withdrawing or accepting groups selected from the group consisting of: electronegative heteroatoms, positively charged groups, quaternary amine groups, conjugated groups, aromatic groups, halogens, nitriles, carbonyls, nitro groups, nitroso groups, sulfones, and sulfonates.

4. The method of claim 1, wherein the multifunctional nucleophile comprises at least two nucleophilic groups, wherein the nucleophilic group comprises a nucleophilic atom selected from the group consisting of: C, Si, Ge, Sn, N, P, As, Sb, O, S, Se, and Te.

5. The method of claim 1, wherein the imine forming precursor comprises a material selected from the group consisting of: formaldehyde, aqueous formaldehyde, formalin, 1,3,5-trioxane, metaformaldehyde, paraformaldehyde, glyoxylic acid, MP-glyoxylate, hexamethylentetramine, dimethoxymethane, and formyl cation equivalent.

6. The method of claim 1, wherein the multifunctional nucleophile is a dithiol.

7. The method of claim 6, wherein the aminobenzene compound is a difunctional aniline diimine precursor compound.

8. The method of claim 7, wherein the difunctional aniline diimine precursor compound comprises electron withdrawing or accepting groups selected from the group consisting of: electronegative heteroatoms, positively charged groups, quaternary amine groups, conjugated groups, aromatic groups, halogens, nitriles, carbonyls, nitro groups, nitroso groups, sulfones, and sulfonates.

9. A method for producing a polymer, comprising:
   forming a reaction mixture comprising a solvent, a difunctional aniline diimine precursor compound, a multifunctional nucleophile comprising at least two nucleophilic groups, wherein the nucleophilic group comprises a nucleophilic atom selected from the group consisting of: C, Si, Ge, Sn, N, P, As, Sb, O, S, Se, and Te, an imine forming precursor; and
   heating the reaction mixture at a temperature from about 50° C. to about 150° C. to produce a polymer.

10. The method of claim 9, wherein the difunctional aniline diimine precursor compound comprises electron withdrawing or accepting groups selected from the group consisting of: electronegative heteroatoms, positively charged groups, quaternary amine groups, conjugated groups, aromatic groups, halogens, nitriles, carbonyls, nitro groups, nitroso groups, sulfones, and sulfonates.

11. The method of claim 9, wherein the imine forming precursor comprises a material selected from the group consisting of: formaldehyde, aqueous formaldehyde, formalin, 1,3,5-trioxane, metaformaldehyde, paraformaldehyde, glyoxylic acid, MP-glyoxylate, hexamethylentetramine, dimethoxymethane, and formyl cation equivalent.

12. The method of claim 9, wherein the multifunctional nucleophile is a dithiol.

13. The method of claim 9, wherein the difunctional aniline diimine precursor compound comprises electron withdrawing or accepting groups selected from the group consisting of: electronegative heteroatoms, positively charged groups, quaternary amine groups, conjugated groups, aromatic groups, halogens, nitriles, carbonyls, nitro groups, nitroso groups, sulfones, and sulfonates.

14. The method of claim 13, wherein the difunctional aniline diimine precursor compound has the general structure

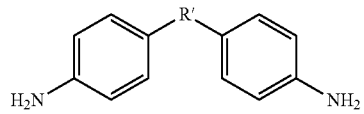

or the general structure

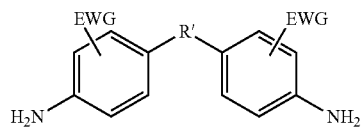

wherein R' includes an electron withdrawing or electron accepting group, and EWG is an electron withdrawing group.

15. A method for producing a polymer, comprising:
   forming a reaction mixture comprising a solvent, a difunctional aniline diimine precursor compound having the general structure

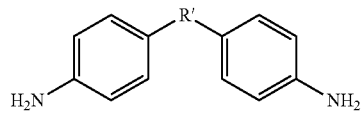

or the general structure

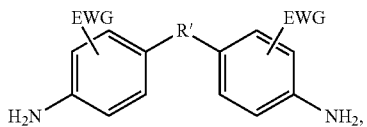

a multifunctional nucleophile comprising at least two nucleophilic groups, and an imine forming precursor comprising a material selected from the group consisting of: formaldehyde, aqueous formaldehyde, formalin, 1,3,5-trioxane, metaformaldehyde, paraformaldehyde, glyoxylic acid, MP-glyoxylate, hexamethylentetramine, dimethoxymethane, and formyl cation equivalent, wherein R' includes an electron withdrawing or electron accepting group, EWG is an electron withdrawing group, and each nucleophilic group comprises a nucleophilic atom selected from the group consisting of: C, Si, Ge, Sn, N, P, As, Sb, O, S, Se, and Te; and heating the reaction mixture at a temperature from about 50° C. to about 150° C. to produce a polymer.

16. The method of claim 15, wherein the electron withdrawing or accepting groups are selected from the group consisting of: electronegative heteroatoms, positively charged groups, quaternary amine groups, conjugated groups, aromatic groups, halogens, nitriles, carbonyls, nitro groups, nitroso groups, sulfones, and sulfonates.

* * * * *